April 3, 1928.                    A. H. HARDMAN                    1,664,682
                                 PUSH BUTTON SWITCH
                              Original Filed Aug. 26, 1926

Inventor
A. H. Hardman
By Lacey & Lacey, Attorneys

Patented Apr. 3, 1928.

1,664,682

UNITED STATES PATENT OFFICE.

ALBERT H. HARDMAN, OF WHEELING, WEST VIRGINIA.

PUSH-BUTTON SWITCH.

Original application filed August 26, 1926, Serial No. 131,718. Divided and this application filed April 1, 1927. Serial No. 180,243.

The present invention is directed to improvements in push button switches, and is a divisional application of my copending application for signals for automobiles, filed August 26, 1926, Serial No. 131,718.

The primary object of the invention is to provide push button switches which are located direct upon the steering wheel of a vehicle so that it will be unnecessary for the driver of the automobile to remove either hand from the wheel in order to operate the push buttons in order to signal the direction in which he intends to turn.

Another object of the invention is to provide a novel construction of push button switch for attachment to the steering wheel of an automobile which is extremely simple in construction, durable, and efficient in operation.

Figure 1:
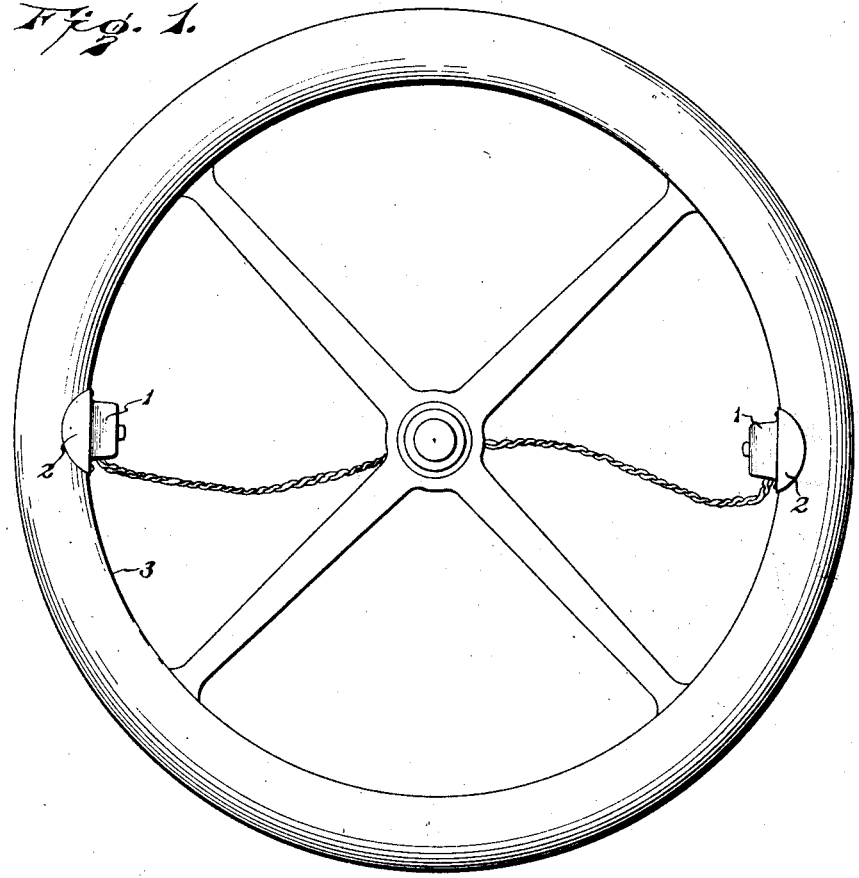
Figure 1 is a plan view of a steering wheel showing a pair of the push button switches mounted thereon.
Figure 2:
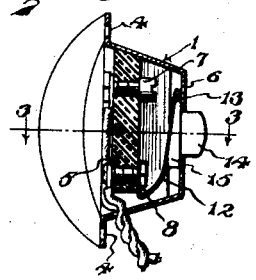
Figure 2 is a longitudinal sectional view through one of the push button switches.
Figure 3:
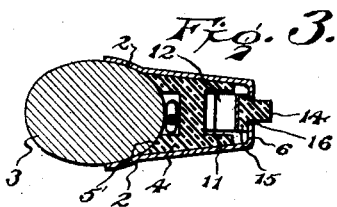
Figure 3 is a sectional view on line 3—3 of Figure 2.

Each push button switch comprises a casing 1 having side portions 2 which are designed to embrace the inner side of the rim 3 of the steering wheel, the base of said casing having openings 4 at its ends for the passage of suitable securing screws, not shown, for securing the casing to said rim of the wheel. Disposed within the casing 1 at the open side thereof or, in other words, the side which is presented to the rim of the wheel is a body 5 of insulating material, such as fiber which has its side which is presented to the rim of the wheel transversely concave, as indicated by the numeral 5', to conform to the contour of said rim, the body of the casing having its side and end walls converging in the direction of its outer wall 6, and said body 5 being correspondingly formed so that the body is frictionally held by wedging engagement within the body of the casing, and by reason of its engagement with the rim of the wheel. Binding posts 7 and 8 are secured through the body 5 and the conductor wires 9 and 10 lead therefrom to a signal casing, not shown, in order to illuminate the direction indicia thereon.

The body 5 has a longitudinal recess 11 in its side which is presented toward the outer wall 6 of the body of the casing and a leaf spring contact 12 is anchored at one end by the binding post 8 and, therefore, in electrical contact therewith, and is turned upwardly from the post and in the direction of the said outer wall 6 of the casing, its free end bent back, as at 13, to provide a shoulder, and this end of the contact is normally rotated through the resiliency of said contact, in spaced relation to but opposite the adjacent end of the binding post 7. The numeral 14 indicates a push button which is provided with a spaced portion 15 against which the leaf spring contact 12 bears, and one end of which spaced portion is engaged by the shoulder 13 of said leaf spring contact. The portion of the contact which engages the base 15 of the push button is extended at an angle to the outer wall 6 of the casing and the inner side of the base is inclined to the outer side thereof to correspond to the angular disposition of said portion of the contact. The push button 14 projects through a slot 16 formed in the wall 6 and the button is normally held in this position through the resiliency of the contact 12, it being understood that by pressing inwardly against the button, the contact will be flexed in its resiliency so as to engage the binding post 7, thus closing the circuit through the selected bulb in the signal casing proper. It will be understood that the engagement of the base of the push button against the shoulder 13 serves to maintain the head of the button centered with relation to the slot 16. It will likewise be evident that by mounting the push button switches upon the inner side of the rim of the steering wheel at the opposite side of said wheel the buttons of the switches are in convenient position to be pressed by the thumb of either hand without the necessity of the driver releasing his hold upon the wheel.

Having thus described the invention, I claim:

A push button switch for attachment to the rim of the steering wheel of an automobile, comprising a casing having a side to embrace the said rim and be secured thereto, a body of insulating material fitted into said casing at the side thereof, spaced binding posts mounted upon said body for the connection thereto of conducting wires, the said body at its side which is presented at said side of the casing being transversely formed to conform to the contour of said rim, the casing being inwardly tapered and the said body being correspondingly tapered to have frictional engagement therewith, a resilient leaf contact secured at one end to one of said posts, and having its other end located at the other post and normally spaced therefrom, the wall of the casing opposite the said side thereof having a slot therein, and a push button engaged in said slot and having a base portion engaged by said leaf contact.

In testimony whereof I affix my signature.

ALBERT H. HARDMAN. [L. S.]